United States Patent [19]
Fiveash

[11] Patent Number: 5,564,362
[45] Date of Patent: Oct. 15, 1996

US005564362A

[54] ANIMAL FOOD DISH LATERALLY OFF-SET FROM STABILIZING BASE FORMING WATER DISH

[76] Inventor: Ramon A. Fiveash, 5938 Woodway Place Ct., Houston, Tex. 77057

[21] Appl. No.: 459,323

[22] Filed: Jun. 2, 1995

[51] Int. Cl.⁶ .................................................. A01K 5/01
[52] U.S. Cl. ..................... 119/51.5; 119/61; 220/23.83
[58] Field of Search ................. 119/51.5, 61; 220/23.2, 220/23.4, 23.6, 730, 731, 23.83; 248/213.2; D30/129, 130, 131, 132, 133

[56] References Cited

U.S. PATENT DOCUMENTS

| | | |
|---|---|---|
| D. 230,035 | 1/1974 | Bowman . |
| D. 273,430 | 4/1984 | Salinas . |
| D. 289,208 | 4/1987 | Fanciullo . |
| 292,651 | 1/1884 | Hentschke ............................. 220/23.83 |
| D. 296,371 | 6/1988 | Lorenzana et al. . |
| D. 300,278 | 3/1989 | Morrell ................................. D30/129 |
| D. 316,382 | 4/1991 | Lorenzana et al. . |
| D. 332,846 | 1/1993 | Geuvjehizian . |
| D. 338,285 | 8/1993 | Chrisco . |
| D. 338,288 | 8/1993 | Key . |
| D. 342,352 | 12/1993 | Embrey . |
| 1,855,314 | 4/1932 | Schacht ................................. 119/51.5 |
| 2,329,660 | 9/1943 | Smith .................................... 220/23.2 |
| 2,784,520 | 3/1957 | Johnson . |
| 2,887,988 | 5/1959 | Cottongim . |
| 3,441,003 | 4/1969 | DuMond et al. . |
| 3,661,121 | 5/1972 | Zielin .................................... 119/61 |
| 4,128,080 | 12/1978 | Haney . |
| 4,192,256 | 3/1980 | Clugston .............................. 119/51.5 |
| 4,399,772 | 8/1983 | Salinas . |
| 4,607,758 | 8/1986 | Stevens ................................. 220/23.83 |
| 4,802,302 | 2/1989 | Alnafissa . |
| 4,896,627 | 1/1990 | Riddell . |
| 4,981,108 | 1/1991 | Faeroe . |
| 5,031,575 | 7/1991 | Phillips . |
| 5,069,166 | 12/1991 | Ahuna . |
| 5,069,167 | 12/1991 | Kasselman . |
| 5,113,798 | 5/1992 | Rera . |
| 5,125,363 | 6/1992 | McGaha . |
| 5,165,365 | 11/1992 | Thompson . |
| 5,205,242 | 4/1993 | Kasselman . |
| 5,245,948 | 9/1993 | McClellan . |
| 5,253,609 | 10/1993 | Partelow et al. . |
| 5,277,149 | 1/1994 | East . |

FOREIGN PATENT DOCUMENTS

| | | | |
|---|---|---|---|
| 387564 | 9/1990 | European Pat. Off. ................. | 119/61 |
| 1133174 | 7/1962 | Germany . | |
| 8401729 | 12/1985 | Netherlands .......................... | 119/51.5 |
| 682036 | 7/1993 | Switzerland ............................ | 119/61 |
| 1344267 | 1/1974 | United Kingdom . | |
| 2220835 | 1/1990 | United Kingdom ................... | 119/61 |

*Primary Examiner*—Todd E. Manahan
*Attorney, Agent, or Firm*—Pravel, Hewitt, Kimball & Krieger

[57] ABSTRACT

An animal feeder containing a water dish and a food dish for preventing crawling insects from crawling into the food dish. A food dish is positioned above the water dish by a vertical post coupled to the bottom of the water dish and a laterally extending support bar to prevent crawling insects from entering the food dish. The support bar extending laterally from the vertical post to the water dish and the absence of any water directly beneath the food dish minimize food particles from dropping into the water dish from a feeding animal. Furthermore, the water dish is designed to position the center of mass of the animal feeder toward the food dish, thereby enhancing the stability of the animal feeder.

10 Claims, 2 Drawing Sheets

ANIMAL FOOD DISH LATERALLY OFF-SET FROM STABILIZING BASE FORMING WATER DISH

SPECIFICATION

BACKGROUND OF THE INVENTION

1. Field of the Invention

The present invention relates to an insect-proof animal feeder having a water dish and a food dish assembly which provides stability and minimizes contamination of the water dish by food particles dropping into the water when the animal is eating.

2. Description of the Related Art

A common problem with feeding an animal using a food dish placed on the ground is that crawling insects, such as ants, can crawl into the dish, thereby rendering the food unsanitary and inedible for the pet. One solution to this problem is to place the food dish into a water dish, thereby creating a water barrier which prevents any crawling insects from entering the food dish; however, this arrangement introduces problems of its own. A feeding animal will inevitably drop food particles into the water dish, and interject water into the food dish. Although this basic arrangement of the food and water dishes creates some problems of its own, animal feeder designers still recognize the practicality of using a basic component of an animal feeder, a water dish, to prevent crawling insects from entering the food dish. Thus, in order to improve on this basic concept, the earlier animal feeders sought to provide an apparatus which prevented insects from crawling into the food dish and provided some degree of separation between the food dish and the water dish.

A variety of feeder devices have utilized the water dish in an effort to provide an insect-proof animal feeder. The prior art includes U.S. Pat. No. 4,128,080, entitled "Animal Feeder," granted Dec. 3, 1978, which discloses attaching the base of a vertical support column to the center of the bottom of a water dish. This support column provides support for a food dish suspended above the water dish. This arrangement eliminates the crawling insect problem because the insects cannot crawl from the ground into the food dish without traversing the water barrier. Also, the food remains dry in the food dish situated above the bowl; however, this arrangement does not solve the problem of food particles dropping into the water from the food dish above when the animal is eating the food.

An animal feeder disclosed in U.S. Pat. No. 4,399,772, entitled "Animal Feeder," granted Aug. 23, 1983, discloses a lateral support means which extends from the top of the vertical support column described above, thereby extending the food dish from a position over the water to a position away from the water where food particles do not directly drop into the water dish. However, such arrangement introduces an additional problem. The suspended food dish is positioned far from the center of mass of the feeder which is located near the center of the water dish. Thus, that animal feeder is subject to being tipped over by a feeding animal, especially when the water dish is not full. As shown in this disclosure, an arrangement which has multiple food bowls which are diametrically opposed might improve the balance of the animal feeder; however, this is an impractical way to increase stability of the feeder for two reasons. First, multiple food dishes are simply impractical for one animal. Second, the food dishes are still located far from the center of mass of the animal feeder, thereby, still falling short of creating a stable system.

Thus, an animal feeder is desired that prevents crawling insects from entering the food dish; prevents mixing of the water and the food and enhances stability such that a feeding animal cannot tip over the animal feeder.

SUMMARY OF THE PRESENT INVENTION

The present invention relates to a new and improved animal feeder having a food dish suspended above ground and positioned to one side of a watering dish. The watering dish has an upstanding wall with a portion formed in an arc around a portion of the food dish, but spaced therefrom to locate the center of mass of the water in the watering dish toward the food dish so that the water stabilizes the food dish and thereby inhibits tipping of the feeder when an animal is eating the food from the food dish. The upstanding wall is positioned to provide a sufficient air gap or space with respect to the food dish to minimize food particles falling into the food dish when the animal is eating. The bottom of the food dish is maintained a sufficient height above ground to ensure no crawling insects will enter the food dish. The food dish is removable from the water dish to serve as a scoop for food from a supply such as a large sack of dog or cat food, and it also is configured for positioning inside of the wall of the water dish for storage or display.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF PREFERRED EMBODIMENT

Figure 1:
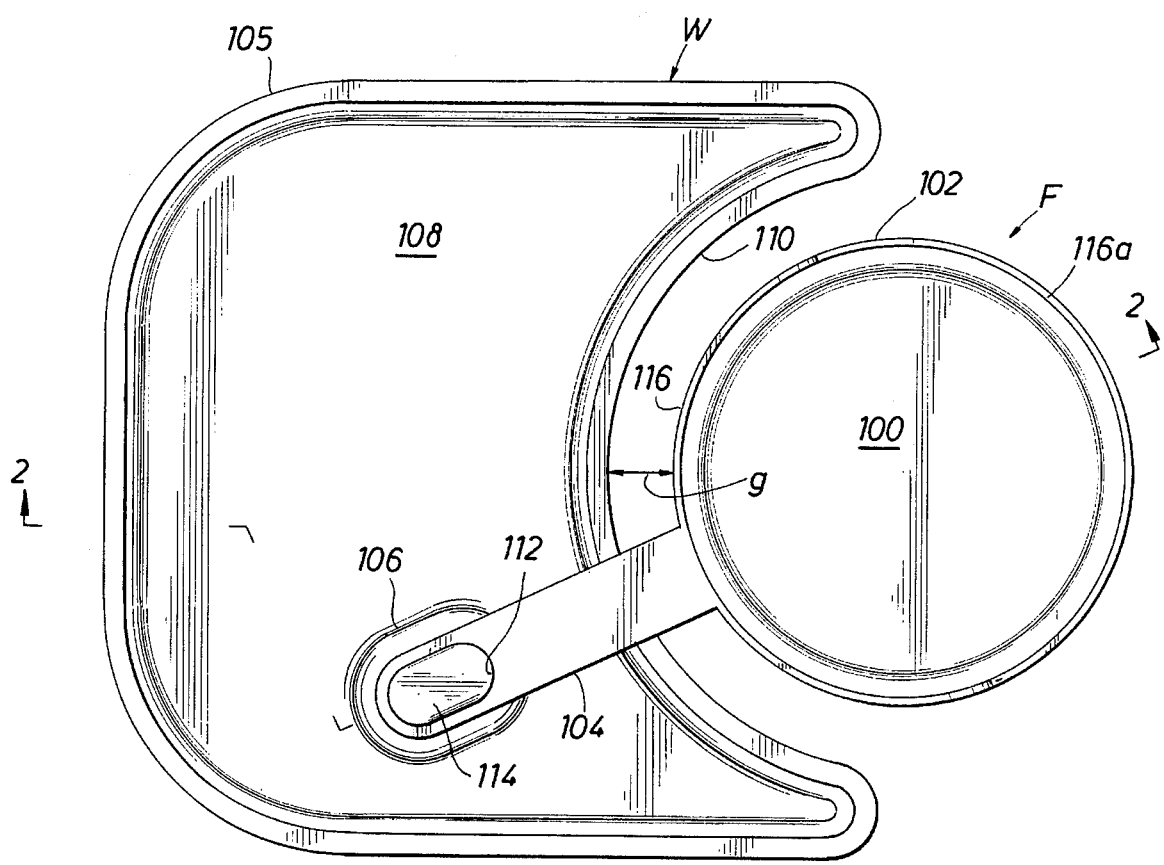
FIG. 1 is a top view of the preferred embodiment of the present invention.

FIG. 1 is a top view of the animal feeder including a water dish W and a food dish F. A sufficient distance h exists under the food dish F to prevent crawling insects from entering the food dish F (shown in FIG. 2). The food dish F consists of an upstanding wall 102 integral with a bottom piece 100. Wall 102 extends around the periphery of the bottom piece 100. An air gap g exists between the food dish F and the water dish W to minimize food particles falling into the water dish W when the animal is eating. In the preferred embodiment, wall 102 includes a splash guard 116 (shown in FIG. 2) located on the portion of side wall 102 adjacent to the water dish W which provides further protection from food particles entering water dish W. A support bar 104 is connected to and laterally extends from wall 102, thereby providing support for food dish F. In the preferred embodiment, the support bar 104 also functions as a handle; therefore, the support bar 104 and food dish F form a scoop which can be used for obtaining food such as dog or cat food from a typical large supply sack.

Also shown in FIG. 1 is the water dish W. The water dish W preferably has a substantially flat bottom piece 108 which typically rests on the ground or floor. An upstanding wall 110 formed in the shape of an arc of approximately a semi-circle is integral with the bottom piece 108 partially surrounds the food dish F, thereby distributing the center of mass of the food dish F toward the water dish W and vice-versa. Therefore, when the water dish W has water in it, the food dish F is prevented from tipping over, even when the food is in the dish F. Wall 110 is spaced from the dish F to maintain the air gap g which normally prevents food from food dish F from entering water dish W.

Also shown in FIG. 1, is an upstanding wall 105 integral with bottom piece 108, and surrounding the remaining periphery of bottom 108 not connected to wall 110. Wall 110, bottom 108 and wall 105 form the dish W into a reservoir or bowl to hold water. A support post 106 forms the support necessary to support food dish F the distance h above ground. The base of post 106 is preferably molded integrally with the bottom piece 108, and the post 106, which extends upward from bottom 108, is preferably releasably coupled to the lateral handle bar 104. Thus, as can be seen from FIG. 1, crawling insects cannot enter food dish F, particles of food from food dish F are prevented from entering water dish W, and the center of mass of water dish W is located toward food dish F in order to prevent the animal feeder from tipping over, when empty and even when food is in the dish F and water is in the dish W.

Figure 2:
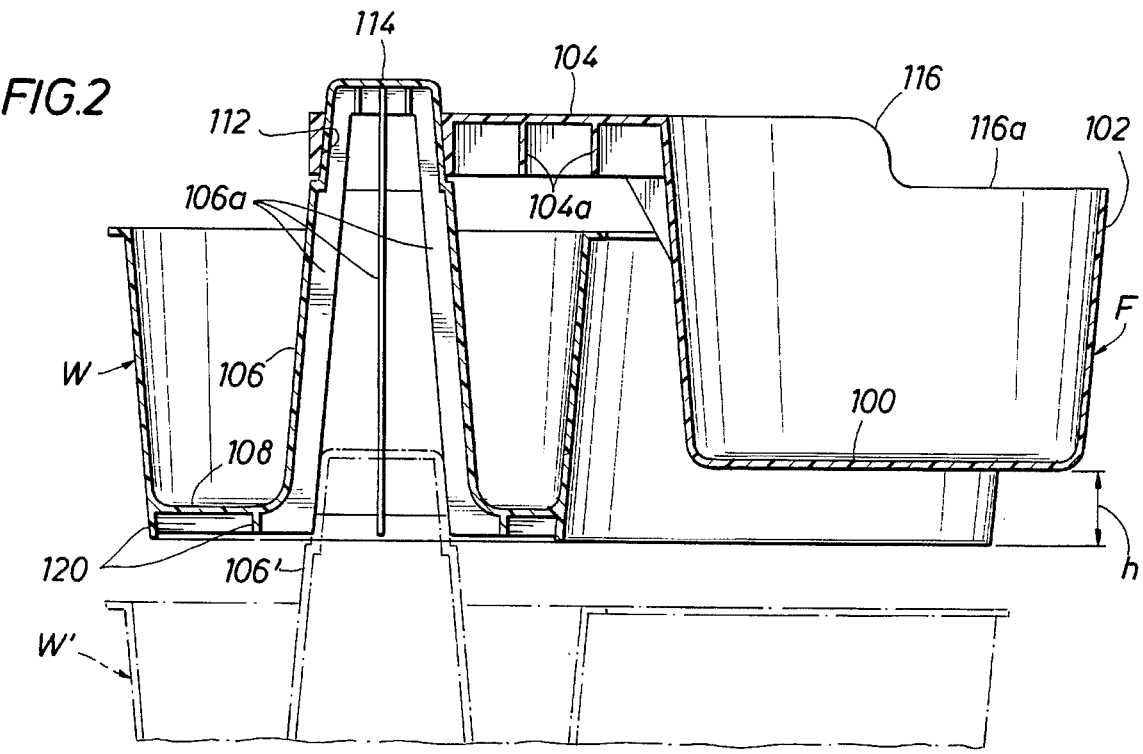
FIG. 2 is a cross-sectional view along line 2—2 of FIG. 1.

Now referring to FIG. 2, a cross-sectional view along line 2—2 of FIG. 1 is shown. In one embodiment, the support bar or handle 104 and post 106 form one continuous piece; however in the preferred embodiment, the support bar or handle 104 is easily detachable from post 106. This allows support bar or handle 104 and food dish F to form a detachable food scoop. Now referring to both FIGS. 1 and 2, in the preferred embodiment, a non-circular coupling post 114 is located at the top of post 106. The support bar 104 has a handle opening 112 fabricated in one end of support handle 104 which, in conjunction with coupling post 114, can mount support bar 104 to post 106. It is noted that the food bowl F has an upwardly extending lip 116 forming a splash guard for a portion of wall 102 to maximize entry of the animal's mouth into the feed at the lower portion 116a, while restricting the fall out of food when the animal is eating. Preferably, the extension lip 116 is approximately semi-circular.

In an alternate embodiment, both coupling post 114 and coupling slot 112 are circular, thereby allowing food dish F to pivot; however, in the preferred embodiment, food dish F is held in a rigid non-pivotal position in order that food dish F will not contact side wall 105, which might allow insects to enter food dish F and food particles to enter water dish W.

FIG. 2 illustrates how the design of the preferred embodiment permits the stacking of multiple animal feeders, thereby aiding in the storage of more than one animal feeder. As shown in FIG. 2, post 106 has a hollow tapered center which allows coupling post such as 106' shown in dot-dash lines to enter and fit snugly inside of the base of post 106, so as to also allow an interfit of a second dish W' inside the first dish W. Thus, two or more dishes W may be stacked in the same manner.

Figure 3:
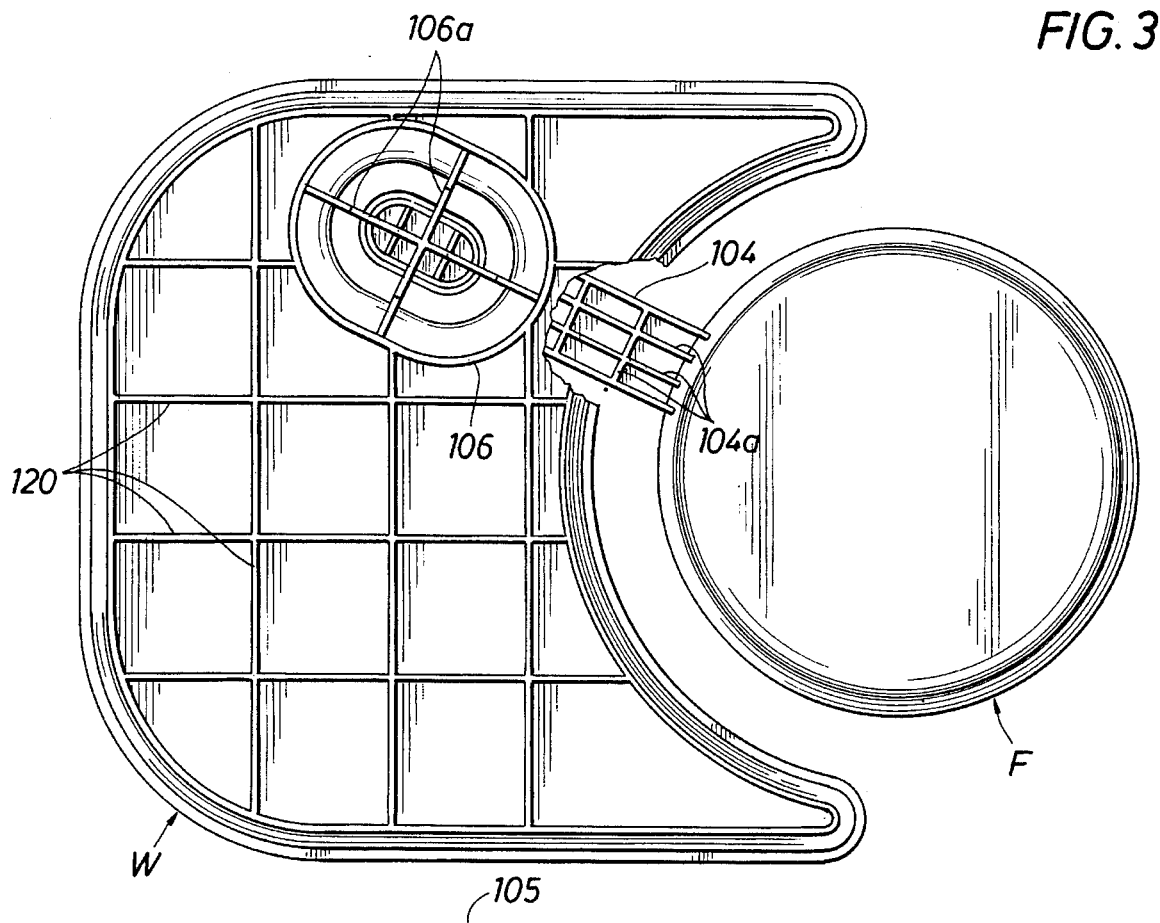
FIG. 3 is a bottom view of the preferred embodiment of the present invention.

FIG. 3 illustrates the preferred configuration of the bottom of the dish W when it is made of a molded plastic material, such as polycarbonate, and which is reinforced by plastic ribs 120 for strength. Similarly, the post 106 has internal ribs 106a, and handle 104 has strengthening ribs 104a.

Figure 4:
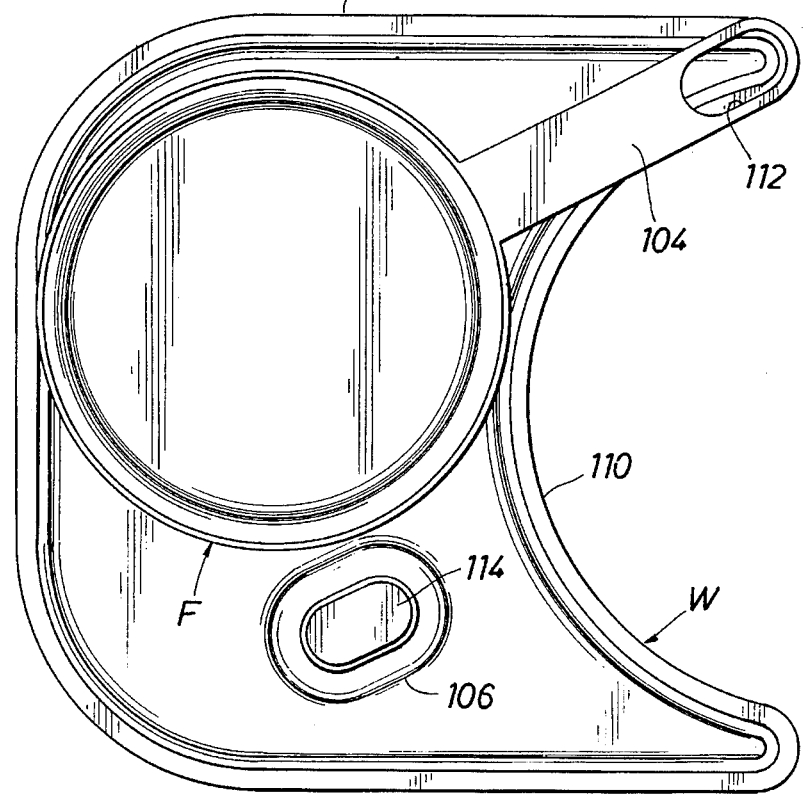
FIG. 4 is a top view of the detachable food scoop stored inside the water dish.

FIG. 4 is a top view of the preferred embodiment illustrating how the detachable scoop can be stored inside the water dish W. As can be seen from FIG. 4, in the preferred embodiment, post 106 is not located in the center of water dish W in order to allow greater access to water in the dish W by a drinking animal and also, storage of the detachable scoop (FIG. 4). In the preferred embodiment, the design and placement of wall 110, wall 105 and post 106 ensure the food scoop F will fit snugly in the water dish W as shown in FIG. 4.

Although the food dish F is shown as a round dish, and the curved surface 110 of the water dish W is shown as an arc, the invention should not be limited to such shapes, since those shapes may vary so long as the edge of the wall 102 is spaced from the wall 110 by a space such as g when the handle 104 is mounted on the post 114.

Similarly, the shape of the rest of the bowl W may vary so long as it is capable of holding enough water or other liquid to counterbalance the weight of the food in food dish F.

The foregoing disclosure and description of the invention are illustrative and explanatory thereof, and various changes in the size, shape and materials, as well as the details of the illustrated operation and construction may be made without departing from the spirit and scope of the invention.

What is claimed is:

1. An animal feeder comprising:

a water dish;

a food dish; and a support means for supporting and suspending said food dish above ground and laterally offset from a position over said water dish, said support means being coupled to said food dish and said water dish; and said water dish having a wall and said food dish having a wall closely positioned relative to each other, said wall of said water dish extending partially around the wall of the food dish but separate therefrom to stabilize the feeder against tipping when the water dish has water in it even though the food dish is suspended above the ground in a laterally offset position.

2. The animal feeder of claim 1, wherein said support means includes a substantially upright support post coupled to the bottom of said water dish.

3. The animal feeder of claim 2, wherein said food dish includes a handle having a handle opening adapted to extend over said water dish; and said support post is adapted to engage in said handle opening to detachably couple said food dish to said water dish.

4. The animal feeder of claim 3, wherein said post is noncircular.

5. The animal feeder of claim 2, wherein said substantially upright support post is laterally offset from the center of the bottom of said water dish.

6. The animal feeder of claim 1, wherein the wall of said water dish is closely positioned and conforms substantially to the shape of the portion of the wall of said food dish near said wall of said water dish.

7. The animal feeder of claim 6 wherein the wall of said water dish forms a substantially semicircular arc.

8. The animal feeder of claim 1, wherein the said food dish has an upwardly extending lip forming a splash guard and extending only for less than one-half of the upper perimeter of the portion of said wall of said food dish disposed near said wall of said water dish to facilitate access to the feed by the animal while minimizing food falling into the water dish by a feeding animal.

9. The animal feeder of claim 1, wherein the wall of said water dish has a curved portion which extends partially around the exterior of said food dish.

10. The animal feeder of claim 1, wherein:

said feed dish is separable from said water dish so as to serve as a feed scoop and for positioning said feed dish in said water dish for storage or display.

\* \* \* \* \*